(12) United States Patent
Shelton

(10) Patent No.: US 10,190,293 B2
(45) Date of Patent: Jan. 29, 2019

(54) VACUUM-ASSISTED IRRIGATION SYSTEM

(71) Applicant: Lonnie Shelton, Pampa, TX (US)

(72) Inventor: Lonnie Shelton, Pampa, TX (US)

( * ) Notice: Subject to any disclaimer, the term of this patent is extended or adjusted under 35 U.S.C. 154(b) by 172 days.

(21) Appl. No.: 15/060,316

(22) Filed: Mar. 3, 2016

(65) Prior Publication Data

US 2016/0258138 A1    Sep. 8, 2016

Related U.S. Application Data

(60) Provisional application No. 62/128,693, filed on Mar. 5, 2015.

(51) Int. Cl.
| | |
|---|---|
| *E21B 43/34* | (2006.01) |
| *E03B 5/06* | (2006.01) |
| *E21B 43/12* | (2006.01) |
| *E03B 3/12* | (2006.01) |

(52) U.S. Cl.
CPC .................. *E03B 5/06* (2013.01); *E03B 3/12* (2013.01); *E21B 43/121* (2013.01); *Y02A 20/116* (2018.01); *Y02A 20/118* (2018.01)

(58) Field of Classification Search
CPC ........ B09C 1/005; E21B 43/121; E21B 43/34
See application file for complete search history.

(56) References Cited

U.S. PATENT DOCUMENTS

| | | | | |
|---|---|---|---|---|
| 3,905,423 A | * | 9/1975 | Sparlin ................... C09K 8/92 |
| | | | | 166/296 |
| 4,534,869 A | * | 8/1985 | Seibert ................... B01D 36/04 |
| | | | | 210/241 |
| RE33,102 E | * | 10/1989 | Visser ..................... B09C 1/005 |
| | | | | 166/267 |
| 5,172,764 A | * | 12/1992 | Hajali .................... B09C 1/005 |
| | | | | 166/267 |
| 5,271,467 A | * | 12/1993 | Lynch ..................... B09C 1/002 |
| | | | | 166/105 |
| 5,441,365 A | * | 8/1995 | Duffney .................. B01D 53/00 |
| | | | | 166/267 |
| 5,452,765 A | | 9/1995 | Blanchard et al. |
| 5,688,076 A | * | 11/1997 | Atkins ................ B01D 17/0205 |
| | | | | 166/267 |
| 6,033,462 A | * | 3/2000 | Dekker .............. B01D 19/0042 |
| | | | | 55/319 |
| 6,146,104 A | * | 11/2000 | Mastroianni ............ B09C 1/002 |
| | | | | 166/370 |
| 7,036,577 B2 | | 5/2006 | Minamijima et al. |
| 2002/0029888 A1 | | 3/2002 | Swensen |

(Continued)

*Primary Examiner* — Kipp C Wallace
(74) *Attorney, Agent, or Firm* — Klarquist Sparkman, LLP

(57) ABSTRACT

Disclosed embodiments concern a system and method for extracting water from a water well using a vacuum-assisted technique. Particular embodiments of the system concern using a water well with a well casing, a casing seal and a water pump within the well, and a water tank, a compressor, and a heat exchanger above ground to withdraw water from the well. In particular embodiments, the casing seal is positioned over the well casing, to which the compressor is fluidly coupled to create a reduced pressure within the well and draw water into the well. In particular embodiments, the system can be used during an entire pumping season, thus providing the ability to extract water and/or increase water extraction from the ground during dry parts of the year and/or freezing parts of the year.

19 Claims, 1 Drawing Sheet

(56) References Cited

U.S. PATENT DOCUMENTS

| | | | |
|---|---|---|---|
| 2004/0031603 A1* | 2/2004 | Minamijima | E02D 3/10 |
| | | | 166/68.5 |
| 2013/0175030 A1* | 7/2013 | Ige | E21B 43/128 |
| | | | 166/250.15 |
| 2015/0034328 A1* | 2/2015 | Abouodah | B09C 1/005 |
| | | | 166/370 |
| 2015/0151986 A1* | 6/2015 | Fearon | C02F 1/48 |
| | | | 166/244.1 |
| 2016/0052814 A1* | 2/2016 | Leyendecker | C02F 9/00 |
| | | | 210/652 |

* cited by examiner

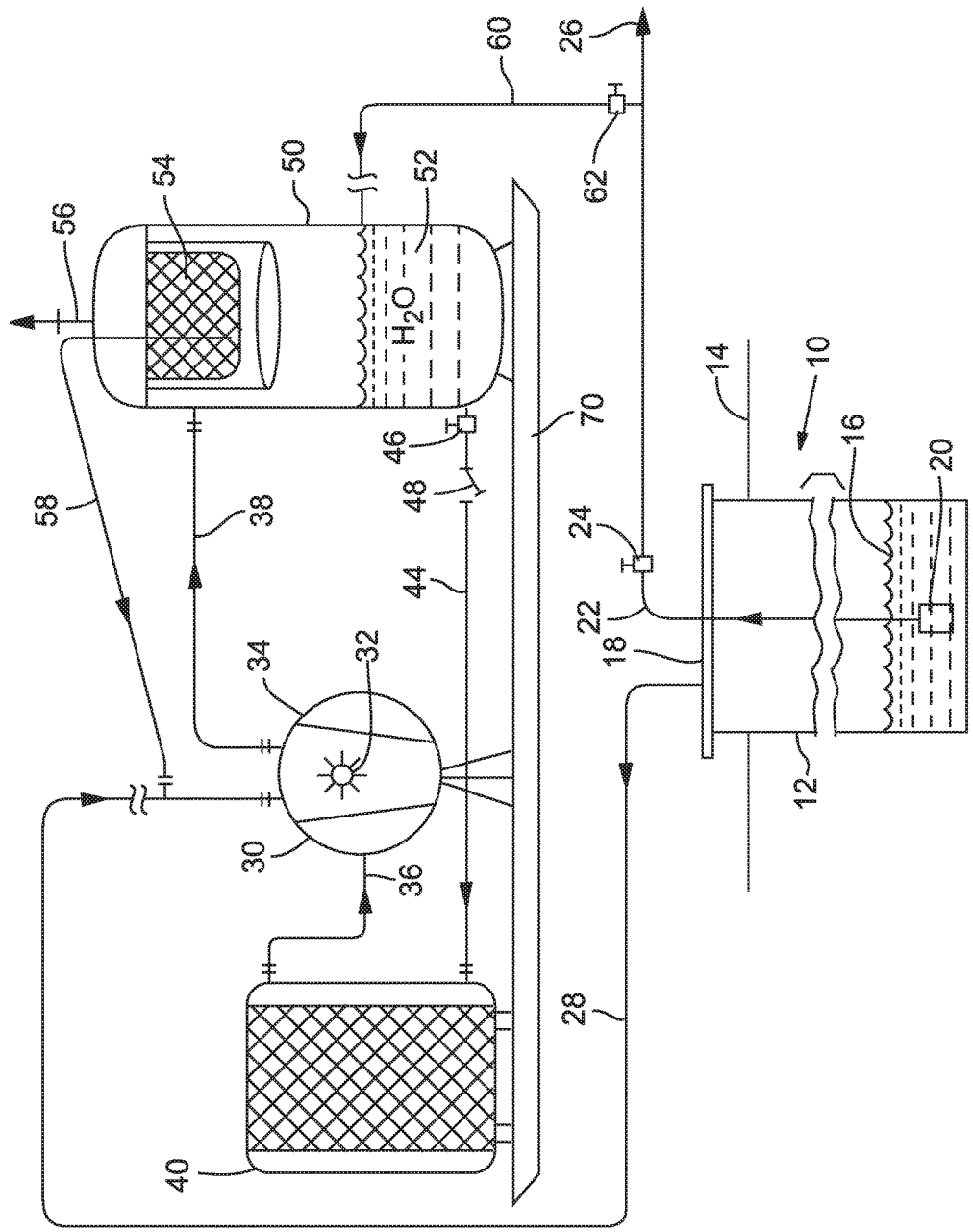

VACUUM-ASSISTED IRRIGATION SYSTEM

CROSS-REFERENCE TO RELATED APPLICATION

This application claims the benefit of U.S. Provisional Application No. 62/128,693, filed Mar. 5, 2015, which is incorporated by reference herein.

FIELD

Disclosed embodiments concern a system and related methods for removing water from a water well located below ground level employing a vacuum pump-assisted technique.

BACKGROUND

In arid areas, water sources may be limited, and therefore it is desirable to maximize the amount of water derived from available sources, such as water wells. An effective and efficient technique for extracting a maximum amount of water from a water well, such as for use in irrigation, is a valuable goal. Systems for extracting groundwater from a well by creating a pressure differential are generally known. However, there still exist limitations in the efficiency and functionality of such systems. For example, air can enter the pump when the groundwater level in the well gets too low, thus impairing the vacuum effect of the vacuum pump. In addition, particular compressors/vacuum pumps with metal-to-metal contact require a constant oil source, and other pumps, such as screw compressors, are expensive and require high energy input. Therefore, there exists a need for a system that overcomes these and other limitations.

SUMMARY

Particular embodiments of the disclosed technology concern a system for extracting groundwater from a water well having a well casing, the system comprising a casing seal positioned over the well casing creating an air-tight seal between the well and the atmosphere; a water tank fluidly coupled to the well, the water tank comprising a lower water reservoir portion, an upper discharge separator portion and an opening for discharging air from the water tank to the atmosphere; a compressor, fluidly coupled to the well and to the water tank, the compressor configured to reduce the air pressure within the well by extracting air from the well such that higher pressure groundwater is drawn into the well, the compressor further configured to conduct the air extracted from the well into the upper discharge separator portion of the water tank; a pump within the well operable to pump groundwater out of the well to either the water tank, to one or more irrigation devices, or to both the water tank and one or more irrigation devices; and an exchanger fluidly coupled to the compressor and to the lower water reservoir portion of the water tank.

Particular embodiments concern a system where the well is located below ground level, and in certain embodiments the bottom of the well and the pump within the well can be located more than 600 feet and/or more than 1000 feet below ground level. In particular embodiments, the casing seal is secured to a well casing within the well in a manner sufficient for maintaining an air pressure differential across the casing seal, such as by using a fastener and/or the weight of the casing seal. The casing seal can further comprise a sealant positioned between the casing seal and the well casing, such as a foam sealant, or a gasket sealant. In certain embodiments, the casing seal comprises an opening coupled to a vacuum line, which can be coupled to the compressor.

Particular embodiments concern a well casing that comprises a generally cylindrical wall that extends around the well's perimeter, such as a tube or a pipe. The well casing typically comprises a strong, rigid material, such as a metal, an alloy, and combinations thereof. In certain embodiments, the well casing is open at the bottom of the well and extends to any length between the bottom of the well and the top of the well. The well casing can also comprise slots that allow water to pass through the well casing into the well. In particular embodiments, the slots are vertically oriented and are about 0.1 inches to about 1 inch wide; more typically 0.5 inches wide. In particular embodiments, the slots have a length ranging from about 0.1 to about 1 inch; more typically the length is about 0.8 inches. Particular embodiments concern a well casing having from about 10 to about 150 slots; more typically, the well casing has about 100 slots. The slots can be located above or below the water level of the well.

Particular embodiments concern a water tank further comprising a filter capable of separating water from air passing through the filter. In particular embodiments, the filter comprises a cotton fabric. In certain embodiments, the water tank is a discharge separator and further comprises a scavenging line that is coupled between the vacuum line and the water tank.

Particular embodiments concern a compressor, wherein the compressor's efficiency increases with increasing suction on a vacuum line. In particular embodiments, the compressor reduces air pressure within the well casing thereby reducing and/or delaying cavitations or vortices in the water as the water level within the well approaches an inlet of the pump. The compressor is selected to reduce the air pressure within the well casing to below atmospheric pressure. Particular embodiments concern using a liquid ring pump as the compressor.

Disclosed embodiments concern using a pump, which can be placed away from the bottom of the well thereby reducing debris passing through the pump. The pump is typically selected to produce a level of power ranging up to about 40 horsepower, or more, with particular embodiments having from about 15 to about 30 horsepower. The power level of the pump can depend on the size and depth of the well and the rate of water being drawn out of the well. In particular embodiments, the pump can be configured to be capable of pumping a maximum of over 160 gallons of water per minute from the well. In use, however, the pump can be used to pump a fraction of the maximum capacity, the actual draw rate being limited by the volume of water available in the well. In one example, the disclosed system was applied to a well previously producing a maximum continuous rate of about 40 gallons of water per minute, due to limited inflow rate of water into the well from the surrounding earth. The application of the disclosed system to the well resulted in the increased inflow of water into the well, with the pump continuously drawing more than 100 gallons of water per minute from the well.

Particular embodiments concern using a heat exchanger, which is selected to reduce the temperature of the water flowing from the water tank to the compressor. In particular embodiments, the temperature of this water is reduced from about 130° F. from the tank to about 70° F. into the compressor. In certain embodiments, the compressor, the heat exchanger, and the water tank are mounted on a sled selected to allow portability, such that the sled can be moved and applied to different water wells.

The foregoing and other objects, features, and advantages of the invention will become more apparent from the following detailed description, which proceeds with reference to the accompanying figures.

BRIEF DESCRIPTION OF THE DRAWINGS

FIG. 1 is a schematic of an embodiment of the disclosed system.

DETAILED DESCRIPTION

Described here are embodiments of a system, components thereof, and related methods for removing water from a water well. The following description is exemplary in nature and is not intended to limit the scope, applicability, or configuration of the invention in any way. Various changes to the described methods may be made in the function and arrangement of the elements described herein without departing from the scope of the invention.

As used in this application and in the claims, the singular forms "a," "an," and "the" include the plural forms unless the context clearly dictates otherwise. The term "includes" means "comprises." Further, the term "coupled" generally means electrically, electromagnetically, and/or physically (e.g., mechanically or chemically) coupled or linked and does not exclude the presence of intermediate elements between the coupled or associated items absent specific contrary language.

The embodiments described herein can include an above ground vacuum system for reducing air pressure within a water well to increase water inflow into the well from the surrounding earth and thus increase water output from the well. With reference to FIG. 1, an exemplary water well 10 is shown having a casing 12 and a casing seal 18. The well 10 can have any depth, such as from a few feet to more than 1000 feet below the ground level 14. The casing 12 can form a generally cylindrical wall, such as a pipe or tube, extending around the perimeter of the well 12. In some embodiments, the casing 12 can be open at the bottom. The casing 12 can terminate short of the bottom of the well 10. The casing 12 can comprise a strong, rigid material, such as metal, an alloy, and combinations thereof. The casing 12 can comprise slots (not shown) along the wall, which allow ground water to pass through the casing and into the well 10. The slots can be vertically oriented and can be about 0.1 inches to about 1 inch wide. In addition, the slots are typically selected to range in length from about 0.1 inches to about 1 inch. Particular embodiments concern slots that are 0.5 inches wide and about ⅘ inches long. In some embodiments, the casing 12 can comprise approximately 50 to 150 slots, and even more typically, 100 slots, which are located at the lower end of the casing. The number of slots can be any number, and can be based on the dimensions of the well. Some slots can be above the water level 16 and some slots can be below the water level.

A casing seal 18 can be positioned over the top end of the casing 12 to form an air tight seal on the well 10. The casing seal 18 can be secured to the casing 12 such that an air pressure differential can be maintained across the casing seal. The casing seal 18 can comprise a sealant, such as a foam sealant or gasket, positioned between the casing seal and the top end of the cylindrical casing 12. The weight of the casing seal 18 can be sufficient to create an air-tight seal. The pressure differential across the casing seal 18 can further tighten the seal. In some embodiments, the casing seal 18 can be secured to the casing 12 with fasteners, such as bolts and/or other mechanical locking mechanisms. The casing seal 18 can enable an air pressure below atmospheric air pressure to be maintained within the well casing 12.

A water pump 20, such as an electric positive displacement pump, can be positioned in the well 10 below the water level 16. The pump 20 can be spaced from the bottom of the well to reduce debris passing through pump. In exemplary embodiments, he pump can produce a level of power ranging up to about 40 horsepower, or more, with particular embodiments having from about 15 to about 30 horsepower. The power level of the pump 20 can depend on the size and depth of the well and the desired rate of water to be drawn out of the well. In particular embodiments, the pump can be configured to be capable of pumping a maximum of more than 160 gallons of water per minute from the well. In use, however, the pump 20 can be used to pump a fraction of its maximum capacity, the actual draw rate being limited by the amount of water available in the well. In one example, the disclosed system shown in FIG. 1 was applied to a well previously producing a maximum continuous output rate of about 40 gallons of water per minute, due to the limitation of inflow rate of water into the well from the surrounding earth. The application of the disclosed vacuum system to the well resulted in an increased inflow of water into the well from the surrounding earth, with the pump continuously drawing more than 100 gallons of water per minute from the well.

A water conduit 22 fluidly coupled to the pump 20 can transport water from the submerged pump 20 out of the well 10, through the casing seal 18 and to a water outlet, such as a water storage container, an irrigation system, or other desired water destination 26. The water conduit 22 can comprise a valve 24 to open and close the flow of water through the conduit. The casing seal 18 can comprise an opening through which the water conduit 22 passes. This opening can be seal around the conduit 22 to form an air-tight seal.

The casing seal 18 can further comprise a second opening coupled to a vacuum line 28 in a similar air-tight fashion. The vacuum line 28 can be fluidly coupled to a rotating vacuum pump or compressor, such as a liquid ring pump 30. In an exemplary embodiment, the liquid ring pump 30 draws in and compresses air from vacuum line 28 by rotating a vaned impeller 32 within an eccentric casing 34. Water from conduit 36 is fed into the pump 30 and, by centrifugal acceleration, forms a moving cylindrical ring against the inside of the casing 34. This liquid ring creates a series of seals in the spaces between the impeller vanes 32, which form compression chambers. The eccentricity between the impeller's axis of rotation and the casing geometric axis results in a cyclic variation of the volume enclosed by the vanes and the ring. Air drawn into the pump 30 from the water well 10 via the vacuum line 28 is trapped in the compression chambers formed by the impeller vanes and the liquid ring. The reduction in volume caused by the impeller rotation compresses the air, which is discharged from the pump 30 via conduit 38 along with some water.

The efficiency of the liquid ring pump 30 can increase when the amount of suction on vacuum line 28 increases. As the pressure differential increases, the liquid ring in the pump 30 can become tighter and form a more effective seal. The liquid ring pump 30 can be more energy-efficient than other pumps or compressors that use oil as a sealant. The higher specific gravity of water compared to oil allows the water ring to produce a tighter seal and allows the pump 30 to be more efficient. Furthermore, there is little or no cost to supply water to the pump 30 as a ready supply of water is available from the water well 10. In addition, the liquid ring pump 30 is capable of creating a total vacuum, or nearly total vacuum, when coupled to a sufficiently strong, sealed enclosure. For these reasons, a liquid ring pump 30 was found to be very well suited to applications with water wells compared to other oil-based pumps or compressors.

The liquid ring pump 30 can draw air from the water well 10 and can reduce the air pressure within the casing 12 to below atmospheric pressure. For example, with an atmospheric pressure of about 13.2 psia, the pump 30 can pull up to about 26.2 inches of mercury on the well casing, depending on the size of the well and number of slots in the well casing, and the rate of inflow of water into the well. In one example, the pump 30 pulls about 5-12 inches of mercury vacuum on the well casing during continuous operation. The air pressure within the casing 12 can be reduced to any level, up to nearly a complete vacuum, and in one example the pressure is reduced about 2-6 psi below atmospheric pressure during operation.

Because the vacuum line is coupled to the casing seal 18, which is sealed to the walls of the casing 12, a reduced pressure, or partial vacuum, is formed in the entire water well 10 below the level of the casing seal 18. The reduced pressure within the well 10 can create an area of reduced pressure in the earth around the bore and thereby cause or increase the permeation of ground water through the slots in the casing 12 and into the well. This water-drawing effect can occur above the water level 16, increasing the volume of water entering the well along the entire length of the casing 12.

When water is pumped out of the well 10 by the pump 20 faster than water is being drawn into the well, the water level 16 can drop. As the dropping water level 16 approaches the level of the water inlet of the pump 20, a cavitation or vortex can occur in the water such that the pump 20 begins to draw in air along with water. This can cause damage to the pump 20 and can cause air bubbles in the conduit 22 and downstream destination 26. To avoid air bubbles and damage to the pump 20, the pumping speed of the pump may need to be reduced (if it is adjustable) and/or the pump may need to be turned off to allow the water level to rise to an acceptable level again before resuming pumping. In other cases, an operator can adjust a downstream valve, such as the valve 24, to increase back pressure on the pump 20 and thereby reduce the pumping rate.

The reduced air pressure in the casing 12, caused by the liquid ring compressor 30, can reduce and/or delay the occurrence of cavitations or vortices in the water as the water level 16 approaches the pump inlet level. Thus, due to the reduced air pressure in the casing 12, the pump 20 can continue to pump water from the well 10 to a lower water level 16 without risking air bubbles or pump damage. This can allow the water well 10 to produce more water without interruption or before stopping the pumping process.

Water is supplied to the liquid ring pump 30 via conduit 36, such as from a heat exchanger 40 or other source. Water entering the pump 30 via conduit 36 can be at any desired temperature, particularly a temperature selected to facilitate the process. For working embodiments, the temperature has been about 70° F. A mixture of air and water exiting the pump 30 passes through conduit 38 into a discharge separator 50. The fluid in conduit 38 can be about 130° F. When the fluid from conduit 38 enters the discharge separator 50, a liquid portion of the fluid falls to the bottom into a water reservoir 52 and a gas portion (i.e., air with some entrained water) rises through a filter, or coalescer, 54. The filter 54 can comprise a fabric, such as cotton, that separate water from the air passing through the filter. Air passing through the filter 54 can continue to rise and exit the separator 50 via an upper outlet 56 into the atmosphere. A scavenging line 58 can be coupled between the vacuum line 28 and the discharge separator 50 to draw moisture passing through the filter 54 back into the pump 30, such that a minimal amount of water is lost from the system through the outlet 56.

Water in the reservoir 52 can be recirculated back into the liquid ring pump 30, such as via the heat exchanger 40. Water in the reservoir 52 can be about 129° F. and can be too hot to be routed directly back into the pump 30. Instead, the water can be routed through conduit 44, through heat exchanger 40, and then through conduit 36 and into the pump 30. The heat exchanger 40 can reduce the temperature of the water back to about 70° F. The conduit 44 can comprise a valve 46 for restricting the flow of water out of the reservoir 52 and a drain outlet 48 for discharging the water from the reservoir.

When the system is operating, water can circulate in a loop through the pump 30, separator 50 and the exchanger 40. However, some water can be lost with the air exiting at 56, causing the water level in the reservoir 52 to drop. To maintain sufficient water in the reservoir 52, a make-up line 60 can be coupled between the well discharge conduit 22 and the discharge separator 50. The conduit 60 can allow a portion of the water from the well discharge conduit 22 to be routed into the reservoir 52 to make up for the water lost through exit 56. An automatic reservoir level-control feature can be included such that water is added from conduit 60 only when the water level in the reservoir drops below a certain level. The cooler water from the conduit 22 (about 55° F.) can also help reduce the temperature of the reservoir 52. A valve 62 can be included in conduit 60 to restrict the rate of water being diverted from the conduit 22 to the conduit 60.

The pump 30, exchanger 40, the separator 50 and/or other components can be mounted on a sled 70 for portability. Using the sled 70, these components can be easily transported, such as to another water well, while the casing 12, seal 18, and pump 20 can be left in the well 10.

Some embodiments of the vacuum-assisted water well pumping system described herein can be used during an entire pumping season, from early spring, through the summer and late into the fall. The low pressure within the casing can help extract water from the ground earlier in the spring, during dryer parts of the year, and later in the fall. Furthermore, the low pressure within the casing can reduce the chances of cavitations in the water within the well such that water can be pumped even when the water level 16 reaches level close the level of the input of the pump 20, which can make more of the water in the well extractable. In addition, the system described herein keeps most of the components above ground such that only the water pump 20 and conduit 22 need to be dropped down the well. This can be a significant advantage with deep (e.g., >600 feet deep) and/or narrow water wells. Along with the sled 70, this also allows for simpler transitions of the system from one water well to another.

In an alternative embodiment, the above-ground components can operate using a different liquid, such as oil. For example, during the winter when the temperatures are below 0° F., water in the system can freeze and cause the system to fail. Liquids like oil can have a lower freezing point and can remain fluid during colder period. The valve 62 can be closed to separate the outflow water 26 from the tank 50. The water in the tank can be replaced with oil, which circulates through the heat exchanger 40 and pump 30 and back to the tank 50 in much the same way as described above with respect to water. A mixture of oil and air pass through conduit 38 and are separated in tank 50, with the oil falling down into the reservoir 52 and the air escaping up through the outlet 56, along with any entrained water vapor from conduit 28. Other liquids, such as anti-freeze, or combinations of liquids, with lower freezing points can also be used during cold periods. This can allow for continuous application of the disclosed system during all times of the year, and thus increased water production during winter months as well.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A", "B,", "C", "A and B", "A and C", "B and C", or "A, B, and C." As used herein, the term "coupled" generally means physically coupled or linked and does not exclude the presence of intermediate elements between the coupled items absent specific contrary language.

In view of the many possible embodiments to which the principles of the disclosed technology may be applied, it should be recognized that the illustrated embodiments are only preferred examples of the technology and should not be taken as limiting the scope of the disclosure. Rather, the scope of the disclosure is at least as broad as the following claims. We therefore claim all that comes within the scope of these claims.

I claim:

1. A system for extracting water from a well, comprising:
   a casing seal positioned over the well creating an air-tight seal between the well and the atmosphere, the casing seal comprising an opening fluidly coupled to an interior of the well;
   a water tank fluidly coupled to the well, the water tank comprising a lower water reservoir portion, an upper discharge separator portion and an opening for discharging air from the water tank to the atmosphere;
   a compressor, fluidly coupled to the opening in the casing seal via a vacuum line, and fluidly coupled to the water tank, the compressor configured to reduce the air pressure within the well by extracting air from the well such that higher pressure groundwater is drawn into the well, the compressor further configured to conduct the air extracted from the well into the upper discharge separator portion of the water tank;
   a pump within the well below the well casing operable to pump groundwater out of the well into a conduit fluidly coupled to both the water tank and one or more irrigation devices, the conduit comprising a valve actuatable between a first position wherein groundwater is directed into the one or more irrigation devices and a second position wherein groundwater is directed into the water tank; and
   a heat exchanger fluidly coupled to the compressor and to the lower water reservoir portion of the water tank.

2. The system of claim 1 where the compressor has an efficiency that increases as a function of increasing suction on the vacuum line.

3. The system of claim 1 where the compressor reduces air pressure within the well and is adapted to reduce or delay cavitations or vortices in the water as the water level within the well approaches an inlet of the pump.

4. The system of claim 1 where compressor reduces air pressure within the well to between about 2 psi and about 6 psi below atmospheric pressure.

5. The system of claim 1 where the compressor is a liquid ring pump and a liquid ring portion of the liquid ring pump forms an increasingly tighter seal with increasing pressure differential.

6. The system of claim 1 where the pump is an electric, positive displacement water pump.

7. The system of claim 1 where the casing seal is secured to a well casing within the well in a manner sufficient for maintaining an air pressure differential across the casing seal.

8. The system of claim 7 where the well casing is open at the bottom of the well and the well casing extends a majority of a length between the bottom of the well and the top of the well.

9. The system of claim 7 where the well casing further comprises radial openings that allow water to pass through the well casing into the well.

10. The system of claim 9 where the radial openings have an aperture dimension ranging from about 0.1 inches to about 1 inch.

11. The system of claim 9 where the well casing comprises at least 10 radial openings.

12. The system of claim 9 where the radial openings are located above and below the water level in the well.

13. The system of claim 1 where the water tank further comprises a filter adapted to separate water from air passing through the filter.

14. The system of claim 1 where the water tank comprises a discharge separator.

15. The system of claim 1 where the system comprises a scavenging line that is coupled between a vacuum line and the water tank.

16. The system of claim 1 where the pump is positioned spaced away from the bottom of the well thereby reducing debris passing through the pump.

17. The system of claim 1 wherein the heat exchanger reduces the water temperature of the water exiting the water tank.

18. The system of claim 1 further comprising a sled, wherein the pump, the exchanger, and the water tank are mounted on the sled to allow portability of the system via the sled.

19. A system for extracting water from a well, comprising:
a casing seal positioned over the well creating an air-tight seal between the well and the atmosphere;
a separator tank fluidly coupled to the well, the separator tank comprising a lower liquid reservoir portion, an upper discharge separator portion and an opening for discharging gas from the separator tank to the atmosphere;
a compressor, fluidly coupled to the well and to the separator tank, the compressor configured to reduce the air pressure within the well by extracting air from the well such that higher pressure groundwater is drawn into the well, the compressor further configured to conduct the air extracted from the well into the upper discharge separator portion of the separator tank;
a pump within the well below the well casing operable to pump groundwater out of the well into a conduit fluidly coupled to both a water tank and one or more irrigation devices, the conduit comprising a valve actuatable between a first position wherein groundwater is directed into the water tank and a second position wherein groundwater is directed into the one or more irrigation devices; and
a heat exchanger fluidly coupled to the compressor and to the lower liquid reservoir portion of the separator tank;
wherein the lower liquid reservoir portion comprises oil that circulates through the heat exchanger, the compressor and back to the separator tank.

* * * * *